US006815926B2

(12) United States Patent
Fei et al.

(10) Patent No.: US 6,815,926 B2
(45) Date of Patent: Nov. 9, 2004

(54) SINGLE PHASE INDUCTION MOTOR WITH PARTIALLY SHARED WINDINGS

(75) Inventors: Renyan William Fei, Quingdao (CN); Mark C. Dierkes, Arnold, MO (US)

(73) Assignee: Emerson Electric Co., St. Louis, MO (US)

( * ) Notice: Subject to any disclaimer, the term of this patent is extended or adjusted under 35 U.S.C. 154(b) by 280 days.

(21) Appl. No.: 10/071,329

(22) Filed: Feb. 6, 2002

(65) Prior Publication Data

US 2003/0146732 A1 Aug. 7, 2003

(51) Int. Cl.$^7$ .................................................. H02P 7/48
(52) U.S. Cl. ...................... 318/773; 318/748; 318/772; 318/775; 318/777; 318/779
(58) Field of Search ................................ 318/748, 751, 318/752, 753, 772, 773, 775, 776, 777, 778, 779, 785, 786

(56) References Cited

U.S. PATENT DOCUMENTS 6,223,416 B1    5/2001   Boyd, Jr. et al.

FOREIGN PATENT DOCUMENTS

FR    1476270    4/1967
GB    1265374    3/1972

Primary Examiner—Rina I Duda
(74) Attorney, Agent, or Firm—Senniger, Powers, Leavitt & Roedel

(57) ABSTRACT

A single phase, three-speed induction motor having 4, 6, and 8-pole speed configurations. In one embodiment, the motor is constructed and arranged to be used in connection with a washing machine. The 8-pole speed winding shares a portion of the 4-pole speed winding, but not all of the 4-pole speed winding is used in the 8-pole configuration. In one embodiment, the 4-pole speed winding includes four winding portions and the 8-pole speed configuration uses two of the four winding portions without the need for additional switch contacts to reconfigure the motor for operating in the 4-pole mode or the 6-pole mode. In one embodiment, shared winding portions are wound on the stator core in a generally non-sinusoidal distribution and non-shared winding portions are wound on the stator core in a generally sinusoidal distribution.

22 Claims, 3 Drawing Sheets

SINGLE PHASE INDUCTION MOTOR WITH PARTIALLY SHARED WINDINGS

BACKGROUND OF THE INVENTION

1. Field of the Invention

The invention relates generally to induction motors. In particular, the invention relates to multi-speed, pole-changing, single phase induction motors having a partially shared winding configuration.

2. Description of the Prior Art

Single phase induction motors (including capacitor start motors and split phase motors) having two or more pole configurations are useful in many multi-speed motor applications. For example, some washing machines employ 4/6/8 pole single phase induction motors because such motors provide multi-speed operation for various cycles within a certain speed range, and without the need for additional complicated and expensive controls such as a variable frequency controller. There is a continuing need to design such motors to provide good performance for both running and starting at a low cost of materials and manufacture. The running performance includes evaluating such factors as torque, speed, current, temperature rise, efficiency, size and other factors. The starting performance includes evaluation of the speed-torque curves of the motor.

Some 4/6/8 pole motors in production employ basically independent 4-pole, 6-pole, and 8-pole main windings, as well as an auxiliary winding (e.g a 4-pole auxiliary winding) for starting. In some prior art configurations, the 6-pole winding shares a portion of the 4-pole winding. To reduce the size of the motor and save active material, a new approach to sharing the 4-pole and 8-pole windings has been developed and is described in a co-invented and co-assigned PCT patent application Ser. No. PCT/US99/11235, filed May 20, 1999, entitled SINGLE PHASE THREE SPEED MOTOR WITH SHARED WINDINGS (International Publication Number WO 99/63645), the entire disclosure of which is incorporated herein by reference. In particular, the fully-shared 4/8 pole configuration illustrated therein employs a winding configuration in which all of the windings energized for operating in the 8-pole mode are also energized for operating in the 4-pole mode, no separate winding is provided to operate in the 8-pole mode.

One advantage of the fully shared winding approach is that it reduces manufacturing costs by reducing the amount of wire needed and/or by reducing the stator size. On the other hand, to reconnect the main winding from a 4-pole configuration to an 8-pole configuration, or visa versa, one more contact (such as a single pole, single throw switch) is needed either as part of a starting switch or as part of an external circuit of the motor. If the additional contact is implemented as part of the starting switch, the starting switch will require three switches and four contacts. This implementation makes the starting switch more complicated and expensive to retool and produce. On the other hand, if the additional contact is implemented as part of the external circuit of the motor, the additional contact would typically be in the form of a timer or a relay.

In either case, a new contact is needed to take advantage of the fully shared winding approach. In many circumstances, providing a new contact is an acceptable consideration. In some circumstances, however, a new contact is not desirable. For example, adding a new contact to an existing appliance configuration may be impracticable. As a specific example, adding a new contact does not allow the above described 4/8 pole fully shared motor configuration to be used as a drop in replacement for an existing motor in an appliance configuration that does not provide the additional contact.

For these reasons, a new partially shared winding motor configuration is desired. Such a partially shared winding motor configuration benefits from reduced wiring requirements while eliminating the need for an additional contact. In one form, a partially shared winding motor configuration is chosen to provide a form, fit, and function replacement for an existing appliance motor, without requiring any new contacts.

SUMMARY OF THE INVENTION

The invention meets the above needs and overcomes the deficiencies of the prior art by providing an improved multi-speed induction motor. Briefly described, a single phase, multi-speed induction motor embodying aspects of the invention includes a stator core. A rotor is mounted in a rotational relationship with the stator core. A partially shared winding is on the stator core. The partially shared winding is energized in its entirety when it is desirable to operate the motor in a 4-pole configuration. The partially shared winding is energized in less than its entirety when it is desirable to operate the motor in an 8-pole configuration.

Another embodiment of a motor embodying aspects of the invention includes a stator core. A rotor is mounted in a rotational relationship with the stator core. A plurality of winding components are wound on the stator core. A first one of the plurality of winding components and a second one of the plurality of winding components are selectively energized to operate the motor at a 4-pole pole speed. A third one of the plurality of winding components and the first one of the plurality of winding components are selectively energized to operate the motor at an 8-pole pole speed such that the second one of the plurality of winding components is only energized when the motor is operated at the 4-pole pole speed.

In another aspect, the invention relates to a single phase, three-speed induction motor. The motor includes a stator core and a rotor in rotational relationship with the stator core. A first winding is wound on the stator core and is selectively energized in an N-pole configuration. N is at least two and is an integer multiple of two. The first winding includes a first winding portion and a second winding portion. A second winding is wound on the stator core and is selectively energized in an M-pole configuration. M is two-times N. The second winding shares the first winding portion of the first winding but not the second winding portion of the first winding.

In still another aspect, the invention relates to a motor that is arranged to be operated at a plurality of pole speeds. The motor includes a stator core and a rotor in rotational relationship with the stator core. A first winding portion is on the stator core for operating the motor at a first pole speed. The first winding portion has a substantially sinusoidal wire turn distribution. A second winding portion is on the stator core for operating the motor at the first pole speed. The second winding portion has a substantially nonsinusoidal wire turn distribution.

In yet another aspect, the invention relates to a motor arranged to be operated in a 4-pole configuration and in an 8-pole configuration. The motor includes a stator core and a rotor in rotational relationship with the stator core. A first winding portion is wound on the stator core and is energized only when operating the motor in the 4-pole configuration.

The first winding portion has a substantially sinusoidal wire distribution. A second winding portion is wound on the stator core and energized when operating the motor in the 4-pole configuration and the 8-pole configuration. The second winding portion has a substantially nonsinusoidal wire distribution.

In another aspect, the invention relates to a motor arranged to be operated in a 4-pole configuration, a 6-pole configuration, and an 8-pole configuration. The motor includes a stator core and a rotor in rotational relationship with the stator core. A first winding portion is wound on the stator core and is energized in the 4-pole configuration only. A second winding portion is wound on the stator core and is energized in the 6-pole configuration only. A third winding portion is wound on the stator core and is energized in the 8-pole configuration only. A fourth winding portion is wound on the stator core and is energized in the 4-pole configuration and the 8-pole configuration, but is not energized in the 6-pole configuration.

In another aspect, the invention relates to methods of manufacturing, including methods of manufacturing induction motors and stators for use in connection with induction motors. Such methods include: providing a 4-pole winding that is partially shared in an 8-pole winding configuration; providing a winding that includes a sinusoidally wound winding portion and a non-sinusoidally wound winding portion; and/or providing a winding that includes winding portions that are placed in the slots about the stator in a non-sequential crisscross pattern.

Alternatively, the invention may comprise various other devices, methods, and systems.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
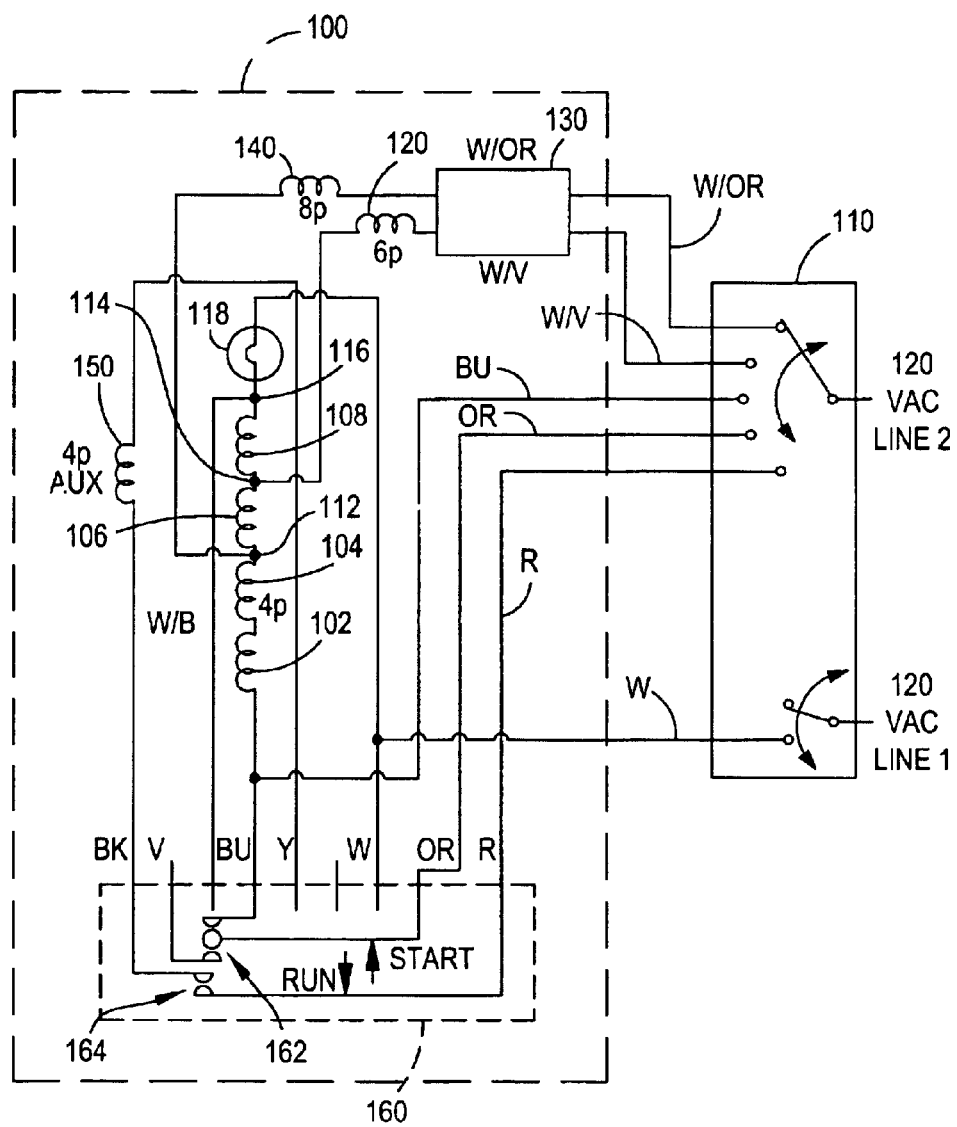
FIG. 1 is an electrical schematic diagram of one preferred embodiment of a three speed, single phase induction motor, having a partially shared winding configuration constructed in accordance with aspects of the present invention.

Referring now to the drawings, FIG. 1 is an electrical schematic diagram of a three speed, single phase induction motor 100 constructed in accordance with aspects of the present invention. For convenience, FIG. 1 illustrates the motor 100 in the context of a common household appliance configuration (e.g., a washing machine), wherein it is desired to operate the motor at one of three speeds. In particular, FIG. 1 illustrates a plurality of windings associated with a stator core configured to operate motor 100 in a 4-pole, a 6-pole, or an 8-pole configuration. The stator core is illustrated and further described in connection with FIGS. 2 and 3. FIG. 1 also illustrates a 4-pole auxiliary winding and the power connections associated with each of the pole configurations. As is generally understood in the art, the 4-pole configuration is energized for operating motor 100 at a relatively faster speed (sometimes referred to as a pole speed). The 8-pole configuration is energized for operating motor 100 at a relatively slower pole speed. The 6-pole configuration is energized for operating motor 100 at a pole speed between the 4-pole speed and the 8-pole speed.

As illustrated, the 4-pole winding configuration includes winding portions 102, 104, 106, and 108 (sometimes referred to as coils). In the illustrated embodiment (i.e., motor 100 being used in connection with a washing machine), the 4-pole configuration receives 120 VAC power from power line 1 and power line 2 via a timer circuit illustrated schematically as a switching circuit 110. More specifically, when motor 100 is configured to operate at the 4-pole speed, 120 VAC line 2 is applied to a connection BU and 120 VAC line 1 is connected to a connection W. The connection BU is connected to the first end of winding portion 102. The second end of winding portion 102 is connected to the first end of winding portion 104. The second end of winding portion 104 is connected to a first junction point 112 which is connected to the first end of winding portion 106. The second end of winding portion 106 is connected to a second junction point 114 which is connected to the first end of winding portion 108. The second end of winding portion 108 is connected to a third junction point 116 which is also connected to the first side of a protector circuit 118. The second side of the protector circuit 118 is connected to the connection W which is, as described above, connected to 120 VAC line 1, thus completing the 4-pole winding circuit. Protector circuit 118 preferably comprises a thermal protector of a type commonly used in the art.

The 6-pole winding configuration includes winding portion 120, as well as winding portion 108. As will be illustrated and described elsewhere herein, in one embodiment, winding portion 120 comprises a plurality of winding portions (120A–120F) but is illustrated in FIG. 1 as the single winding portion 120 for convenience. The 6-pole winding configuration receives 120 VAC power on a connection W/V from power line 2 via a plug connector 130 and switching circuit 110. More particularly, when motor 100 is configured to operate in the 6-pole mode, switching circuit 110 connects power line 2 to the connection W/V via plug 130. Connection W/V is connected, in turn, to the first end of winding portion 120. The second end of winding portion 120 is connected to second junction point 114 and to the first end of winding portion 108. The second end of winding portion 108 is connected to the first side of protector circuit 118. The second side of protector circuit 118 is connected to connection W which, in turn, is connected to 120 VAC line 1, thereby completing the 6-pole winding circuit. It should be appreciated that a different 6-pole winding configuration could also be used in motor 100 that does not include winding portion 108.

The 8-pole winding configuration includes a winding portion 140, winding portion 106, and winding portion 108. Thus, the 8-pole winding configuration shares half of the winding portions (i.e., winding portions 106, 108) of the 4-pole winding configuration. In other words, the 8-pole configuration is a partially shared winding configuration, sharing portions 106 and 108 of the 4-pole winding with winding portion 140. Stated still differently, the 8-pole winding comprises an unshared winding portion 140 (that is energized only when motor 100 operates in the 8-pole configuration) and shared portions of the 4-pole winding (winding portions 106 and 108), but not all of the 4-pole winding (winding portions 102 and 104). Heretofore, such a partially shared configuration has been unknown in the art. It should be appreciated that, although the figures illustrate an 8-pole winding configuration that shares winding portions 106 and 108 with the 4-pole winding configuration, motor 100 could be constructed such that the 8-pole winding shares winding portions 102 and 104 (and not winding portions 106 and 108) with the 4-pole winding configuration.

As illustrated and described elsewhere herein, in one embodiment, winding portion 140 comprises a plurality of winding portions (140A–140D) and is illustrated in FIG. 1 as the single winding portion 140 for convenience. The 8-pole winding configuration receives 120 VAC power on a connection W/OR from power line 2 via plug 130 and switching circuit 110. When motor 100 is configured to operate in the 8-pole mode, switching circuit 110 connects power line 2 to the connection W/OR. Connection W/OR is connected to the first end of winding portion 140. The second end of winding portion 140 is connected to the first junction point 112 and to the first end of winding portion 106. The second end of winding portion 106 is connected to the first end winding portion 108. The second end of winding portion 108 is connected to the first side of protector circuit 118. The second side of protector circuit is connected to connection W, which is connected to power line 1 via switching circuit 110, thereby completing the circuit.

In one embodiment, motor 100 also includes a 4-pole auxiliary winding 150 which is energized in connection with starting motor 100. In the illustrated embodiment, starting is accomplished by a motor switch 160, having switch contacts 162, 164. In one embodiment, the motor switch 160 comprises a centrifugal switch. In FIG. 1, motor switch 160 is illustrated in the starting configuration. As is known in the art, motor switch 160 disengages from the starting configuration and moves into the run configuration when the rotation of motor 100 rises to a sufficient level (i.e., the rotation of the motor rotor exceeds a threshold value). In other words, after a successful start, the rotation of the rotor causes switch contact 164 to become open circuited, thereby disconnecting the auxiliary winding 150. Switches other than centrifugal switches may be used. For example, a solid state, electronic switch can be used. One form of such a solid state switch senses current through the switch to determine when to switch contact points.

It should also be appreciated that if motor 100 is a capacitor start motor, a starting capacitor (not illustrated) is preferably connected between connection Y and connection W/B. If motor 100 is a split phase motor, a similar connection is made without a capacitor (i.e., a short circuit between connection Y and connection W/B). Connection W/B is also connected to the third junction point 116, thereby ensuring that, in the starting mode, current flows through protector circuit 118.

Figure 2:
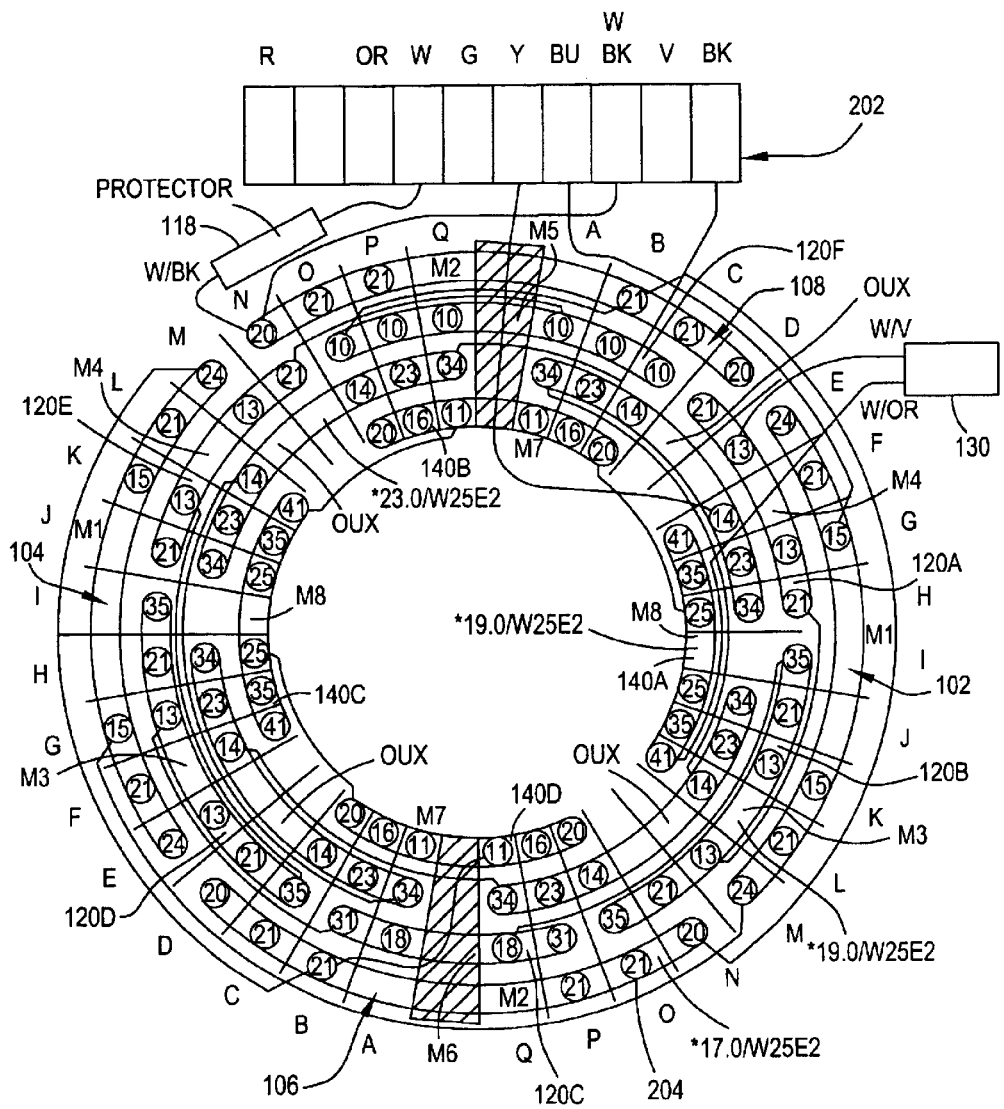
FIG. 2 is stator core winding diagram that illustrates one preferred embodiment of the three speed, single phase induction motor of FIG. 1, in accordance with aspects of the present invention.

FIG. 2 is a winding diagram of a three speed, single phase induction motor constructed according to aspects of the invention. More particularly, FIG. 2 is a winding diagram that illustrates one embodiment of 4/6/8 pole main winding configurations, as well as a 4-pole auxiliary winding configuration, suitable for use with motor 100. Each of the main windings (the main windings and the auxiliary winding) is wound on a stator core having a plurality of slots. FIG. 2 illustrates a stator core having 34 slots (two sets, each slot within a set labeled A–Q respectively). It is within these slots that the various windings are held. The stator core may be formed using known manufacturing techniques, such as stacking a plurality of laminations of a suitable material. FIG. 2 also illustrates plug 130 and a terminal connector block 202.

In general, FIG. 2 illustrates eight main winding components M1, M2, M3, M4, M5, M6, M7, M8, and an auxiliary winding Aux. Each main winding component includes one or more winding portions. Each winding portion is made from a plurality of turns of wire. The number of turns of wire in a particular stator slot is identified in FIG. 2 by numbers enclosed by circles. More specifically, the numbers within a particular circle refer to the number of wire turns of a particular wire size and type that are held in the corresponding slot in connection with an associated main winding component. For example, reference character 204 identifies that twenty-one (21) turns of a seventeen (17) gauge wire are held in the O slot associated with winding portion 106.

When motor 100 operates in the 4-pole winding configuration, 120 VAC power is received on power line 2 via connection BU at the terminal connector block 202 to energize the 4-pole winding. As illustrated, the 4-pole winding comprises main winding components M1 and M2. Winding component M1 is made up of winding portions 102 and 104, and winding component M2 is made up of winding portions 106 and 108. Unlike prior art motors, the 4-pole winding of FIG. 2 is wound non-sequentially about the stator core. More particularly, the 4-pole winding is wound with winding portions 180 degrees apart from each other, thereby creating what may be referred to as a crisscross pattern. Thus, the 4-pole winding configuration proceeds from connection BU to winding portion 102, from winding portion 102 to winding portion 104 (180 degrees across from winding portion 102), from winding portion 104 to winding portion 106, from winding portion 106 to winding portion 108 (180 degrees across from winding portion 106), from winding portion 108 to protector 118, and from protector 118 to connection W.

In the 6-pole winding configuration, the winding is energized by 120 VAC power on power line 2 via connection WV at plug 130. The 6-pole winding comprises main winding components M3, M4, M5, M6, and returns to protector 118 and connection W via winding portion 108. Winding component M3 includes winding portions 120B and 120D. Winding component M4 includes winding portion 120A and 120E. Winding component M5 includes winding portion 120F. Winding component M6 includes winding portion 120C. As illustrated in the embodiment of FIG. 2, the 6-pole winding configuration proceeds clockwise (sequentially) around the stator core in sequential winding portions. Thus, the 6-pole winding configuration proceeds from connection W/V to winding portion 120A, from winding portion 120A to winding portion 120B, from winding portion 120B to winding portion 120C, from winding portion 120C to winding portion 120D, from winding portion 120D to winding portion 120E, from winding portion 120E to winding portion 120F, from winding portion 120F to winding portion 108, from winding portion 108 to protector 118, and from protector 118 to connection W at terminal connector block 202. As indicated above, it is also possible to employ a motor in accordance with aspect of the present invention in which the 6-pole winding does not use winding portion 108.

In the 8-pole winding configuration, the winding is energized by 120 VAC power on power line 2 via connection W/OR at plug 130. The 8-pole winding comprises main winding components M7 and M8, as well as M2. It should be recalled that component M2 is made up of the partially shared winding portions 106 and 108 of the 4-pole winding. Winding component M7 includes winding portions 140B and 140D. Winding component M8 includes winding portion 140A and 140C. As illustrated in FIG. 2, the 8-pole winding configuration proceeds around the stator core in a counterclockwise (sequential) manner and a crisscross (non-sequential) manner. The 8-pole winding is wound sequentially with respect to winding portions 140A–140D, but non-sequentially with respect to the shared winding portions 106 and 108. Thus, the 8-pole winding proceeds from connection W/OR to winding portion 140A, from winding portion 140A to winding portion 140B, from winding portion 140B to winding portion 140C, from winding portion 140C to winding portion 140D, from winding portion 140D to winding portion 106, from winding portion 106 to winding portion 108, from winding portion 108 to protector 118, and from protector 118 to connection W at terminal connector block 202.

As can be appreciated from FIGS. 1 and 2, the 8-pole winding shares a portion of the 4-pole winding. More particularly, in the illustrated embodiment the 8-pole winding shares winding portions 106 and 108. In the prior art, it was only known to share a portion of the 4-pole winding in the 6-pole winding configuration. This sharing was possible only because the 4-pole winding and the 6-pole winding happened to line up in a correct physical arrangement. Before the present invention, a similar claim could not be made with respect to sharing a portion of the 4-pole winding in the 8-pole winding configuration. In the prior art, sharing a portion of the 4-pole winding in the 8-pole configuration resulted in destructive opposing magnetic fields. By winding the 4-pole winding in a manner such as that shown in FIG. 2 (e.g., nonsequentially), such destructive opposing magnetic fields can be avoided, thereby allowing the 8-pole winding configuration to share a portion of the 4-pole winding, without sharing all of the 4-pole winding.

A brief discussion of the poles associated with the 8-pole winding illustrated in FIG. 2 is now provided. In the illustrated embodiment, winding portions 140B and 108 are aligned at the 12 o'clock position, and winding portions 140D and 106 are aligned at the 6 o'clock position (180 degrees apart from 140B/108). Recall that winding portions 106 and 108 are the shared portions of the 4-pole winding. Thus, winding portion 108 allows fewer turns of wire to be used in winding portion 140B. Likewise, winding portion 106 allows fewer turns of wire to be used in winding portion 140D. This feature is perhaps better illustrated by comparing winding various winding portions illustrated in FIG. 2. As can be seen in the exemplary embodiment of FIG. 2, winding portions 140A and 140C require more turns of wire (e.g., 41 turns in the outermost slot) when compared to winding portions 140B and 140D (e.g., 20 turns at the outmost slot). Thus, it should now be appreciated by those of skill in the art that the illustrated winding arrangement allows for winding portions 140B/108 and 140D/106 to produce poles of substantially equal strength to the poles produced by winding portions 140A and 140C.

Further, in the illustrated embodiment, the 8-pole winding is wound as a consequent winding. The 4-pole, 6-pole and auxiliary windings are wound as conventional windings. The consequent winding connections induce poles between each winding portion (e.g., 140A, 140B, 140C, and 140D) to provide a total of eight poles. These poles are positioned roughly at: (a) the 12 o'clock position; (b) between the 12 o'clock position and the 3 o'clock position; (c) the 3 o'clock position; (d) between the 3 o'clock position and the 6 o'clock position; (e) the 6 o'clock position; (f) between the 6 o'clock position and the 9 o'clock position; (g) the 9 o'clock position; and (h) between the 9 o'clock position and the 12 o'clock position.

Advantageously, a partially shared winding configuration, such as the exemplary configuration illustrated herein, requires less wire to construct the 8-pole winding. It should be appreciated that a typical appliance motor uses copper wire to construct each winding. The cost of such wire is not trivial and can fluctuate. Therefore, reducing the amount of wire required provides a substantial cost and manufacturing advantage. In some regards, it also reduces manufacturing complexity because less wire is placed in the slots. Further, it should be appreciated that, unlike prior art configurations having fully shared 4/8 or 2/4 pole windings, the present partially shared 4/8 pole winding configuration does not require an additional switch contact. Therefore, a motor built according to the principles disclosed herein is suitable as a drop in replacement for an existing motor (without shared 4/8 pole windings), thereby providing the advantages associated with shared windings (e.g., reduced wiring) without the additional cost or complexity of the additional switch contacts required by a fully shared winding configuration.

Figure 3:
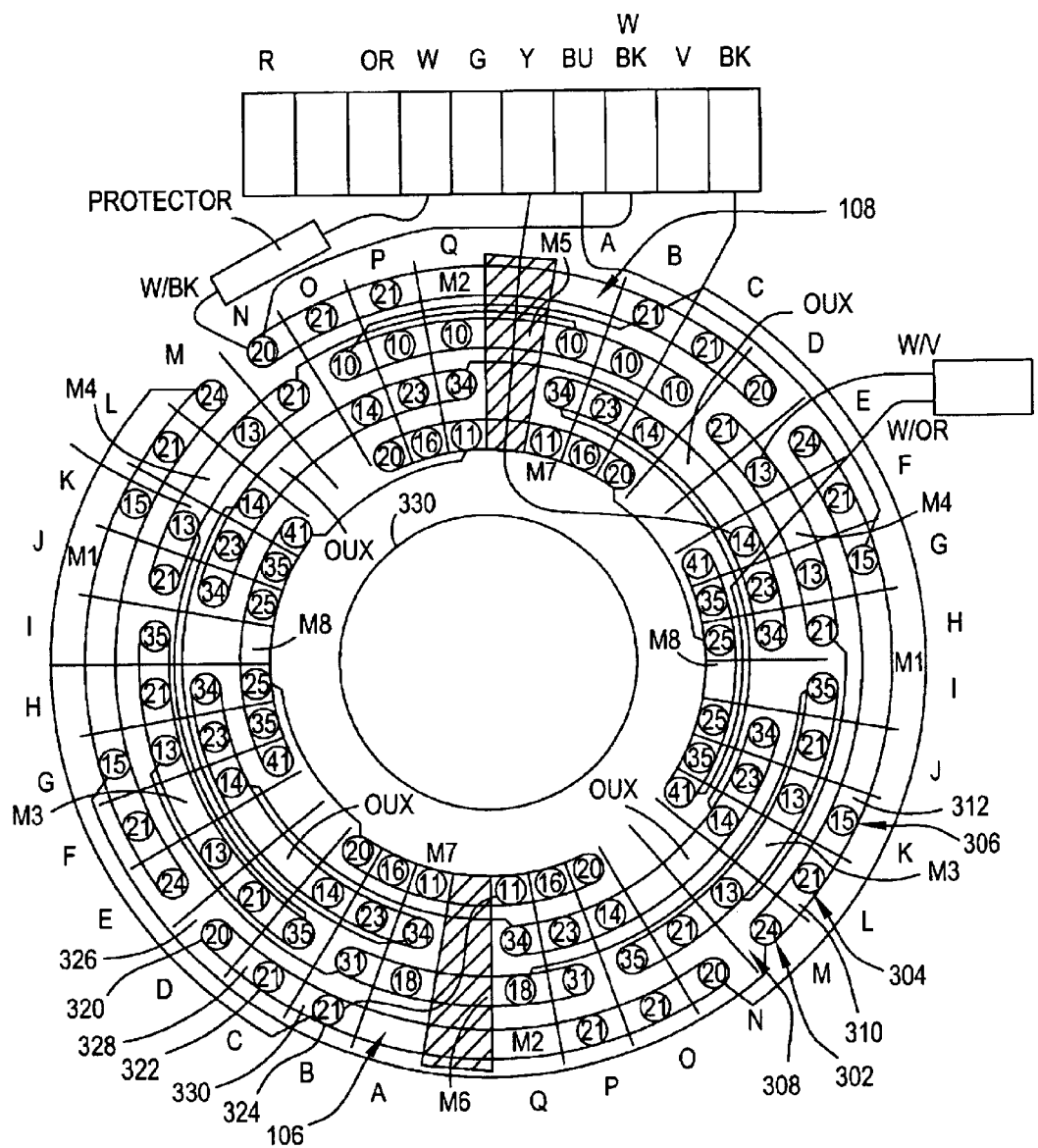
FIG. 3 is a stator core winding diagram that illustrates one preferred embodiment of winding distributions of the motor of FIG. 1, in accordance with aspects of the present invention.

FIG. 3 illustrates the same stator core and windings as FIG. 2. FIG. 3 further highlights additional aspects of the partially shared windings, namely winding portions 106 and 108. In particular, FIG. 3 illustrates that the shared winding portions of the 4-pole winding (portions 106, 108) are distributed in a unique, non-sinusoidal turn count distribution (characteristics of sinusoidal and non-sinusoidal turn count distributions are discussed in greater detail below). Thus, the 4-pole winding includes winding portions wound in a generally non-sinusoidal distribution (portions 106, 108), as well as winding portions wound in a generally sinusoidal distribution (portions 102, 104). The 8-pole winding shares winding portions 106 and 108. As such, the 8-pole winding also includes winding portions wound in a non-sinusoidal distribution, as well as winding portions wound in a sinusoidal distribution (portions 140A–140D). This arrangement improves the 8-pole speed performance when using a partially shared winding configuration.

As can be seen in FIGS. 2 and 3, most of the winding portions are wound in a generally sinusoidal turn count distribution. In a sinusoidal turn count distribution, more turns are wound on the exterior of the winding portion than on the interior of the winding portion. A sinusoidal distribution is the standard distribution currently used in the art with respect to winding main operating winding portions. A non-sinusoidal distribution means that the outside coil turns are shifted to the inside coils. Thus, looking at winding portion 102 for example, there are more winding turns in the slots associated with the outer edge of winding portion 102 than in the slots associated with the interior of winding portion 102. In other words, there are more turns toward the outer edge of the pole than toward the inside of the pole. More specifically, and as illustrated by reference characters 302, 304, and 306, there are twenty-four (24) turns in an outermost slot 308, twenty-one (21) turns in the next slot 310, and fifteen (15) turns in the next slot 312. With the exception of winding portions 106, 108, and 120F, each of the remaining winding portions follows a generally sinusoidal distribution—more turns are located on the outside of the winding portion, with the number of turns decreasing toward the interior of the pole.

As mentioned above, winding portions 106 and 108 are wound in a generally non-sinusoidal distribution. It should be recalled that winding portions 106 and 108 are also the partially shared winding portions that are energized in both the 4-pole and the 8-pole winding configurations (i.e., it is energized to operate the motor at both the 4-pole speed and the 8-pole speed). Winding portions 106 and 108 are wound such that fewer turns are wound in the outermost slot than in the interior slots (i.e., fewer turns toward the outside of the pole). As illustrated by reference characters 320, 322, and 324, there are 20 turns in an outermost slot 326, and 21 turns in each of the next two slots 328 and 330. It has been discovered that such a non-sinusoidal winding pattern is beneficial when the 8-pole winding shares a portion the 4-pole winding. It has also been found that shifting too many turns to the inside of a winding portion can result in a cusp in the 4-pole speed speed/torque curve. Advantageously, a properly selected non-sinusoidal winding distribution for the shared winding portions allows the 8-pole speed configuration to achieve operating performance characteristics similar to those of a non-shared 8-pole winding configuration.

FIG. 3 also illustrates a rotor 330 that is mounted in a rotational relationship with the stator core by techniques that are known in the art. Briefly stated, a rotating magnetic field created by the excitation of one of the winding configurations causes the rotor 330 to rotate at a speed corresponding to the 4/6/8 pole speeds discussed above in connection with FIG. 1. Although FIG. 3 illustrates a rotor inside the stator, the present invention is not limited to such an arrangement and could be adapted for use in connection with, for example, inside-out motor arrangements.

Among the advantages of the partially shared winding configuration, such as the exemplary embodiment illustrated and described herein, is a reduction in the amount of wire needed to construct the 8-pole winding. One indication that can be used to reflect this advantage is the average stator slot fill. When a configuration similar to that of FIG. 2 was compared with a form, fit, and function prior art 4/6/8 pole motor (with 4-pole starting), the average slot fill dropped from approximately 66.37 percent to about 61.8 percent. Similarly, when a configuration substantially similar to that of FIG. 2 was compared to a form, fit, and function prior art 4/6/8 pole motor, the average slot fill dropped from approximately 62.3 percent to approximately 59.2 percent. Such a reduction corresponds to a substantial cost savings with respect to the amount of wire needed to construct a particular motor. Moreover, such reductions in average slot fill also improve manufacturing because less wire is used in the stator slots, which translates to a reduction in the force required to insert the wire. It should be appreciated that a reduction in the insertion force also translates into a reduction in the number of scratched or broken wires during the manufacturing process. Such improvements save costs and improve motor quality.

It should further be noted that sharing a portion of the 4-pole winding in the 8-pole configuration could give rise to thermal concerns in some operating environments and scenarios. For example, thermal concerns may be important if the shared winding portions are energized without sufficient opportunities for cooling the winding. Advantageously, the reduced slot fill that can result from the present invention may be used to account for such thermal concerns. The wire used in the shared portions can be of a sufficiently large size to allow for better cooling.

Another advantage of the present partially shared winding configuration over the prior art is a possible reduction in turn imbalance. Turn imbalance affects motor performance. One measure of turn imbalance is determined by comparing winding portions associated with the 6-pole configuration (referred to herein as the 6-pole turn imbalance). For example, the 6-pole configuration has a pole generated by winding portions 120F and 108 and an opposing pole generated by winding portion 120C. As can be seen, there are more turns of wire in each of the slots associated with winding portion 120C than with winding portion 120F. One embodiment of a motor similar to that illustrated in FIG. 2 improves the 6-pole turn imbalance, as compared to a similar form, fit, and function prior art motor, by reducing that imbalance from approximately 1.38 to approximately 1.22. Another embodiment improved turn imbalance by reducing that imbalance from approximately 1.18 to approximately 1.05.

It should now be appreciated that the partially shared winding configuration illustrated and described herein provides substantial advantages. It should be further appreciated that although a preferred embodiment has been described in connection with a 4/6/8 pole motor configuration, the present invention is not limited to 4/6/8 pole motor configurations. The invention has greater applicability. For example, aspects of the invention may be enjoyed with two-speed motors, such as 2/4 pole motors, 4/8 pole motors, 2/8 pole motors, and so on. Indeed, aspects of the invention may be applied to configurations having a first pole speed of N and another pole speed of M—where N is at least two (or an integer multiple of two such as four) and M is an even integer and is least two-times N. Exemplary partially shared winding pairs include, therefore, 2/4, 2/8, 4/8, 6/12, 8/16, and so on.

It should also be appreciated that foregoing descriptions also relate to methods of manufacturing, including methods of manufacturing induction motors and stators for use in connection with induction motors. Such methods include, for example, (a) winding a 4-pole winding on a stator that has a first winding portion that is shared in an 8-pole winding configuration and a second winding portion that is not shared in the 8-pole winding configuration; (b) providing a winding that includes a sinusoidally wound winding portion and non-sinusoidally wound winding portion; and/or (c) providing a motor winding that includes winding portions that are placed in the slots about the stator in a non-sequential/crisscross pattern.

In view of the above, it will be seen that the several objects of the invention are achieved and other advantageous results attained.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A single phase, multi-speed induction motor comprising:

a stator core;

a rotor in rotational relationship with the stator core;

a partially shared winding on the stator core, said partially shared winding being energized in its entirety when it is desirable to operate the motor in a 4-pole configuration and said partially shared winding being energized in less than its entirety when it is desirable to operate the motor in an 8-pole configuration; and an unshared winding portion on the stator core, said unshared winding portion being energized in connection with a winding portion of the partially shared winding when it is desirable to operate the motor in the 8-pole configuration.

2. A motor as set forth in claim 1 wherein the partially shared winding comprises a first winding portion and a second winding portion, wherein said first winding portion is arranged to be energized when it is desirable to operate the motor in the 4-pole configuration and in the 8-pole configuration, and said second winding portion is arranged to be energized only when it is desirable to operate the motor in the 4-pole configuration.

3. A motor as set forth in claim 2 wherein the partially shared winding further comprises a third winding portion and a fourth winding portion, wherein said third winding portion is arranged to be energized when it is desirable to operate the motor in the 4-pole configuration and in the 8-pole configuration, and said fourth winding portion is arranged to be energized only when it is desirable to operate the motor in the 4-pole configuration.

4. A motor as set forth in claim 3 wherein the first, second, third and fourth winding portions are wound on the stator core non-sequentially.

5. A motor as set forth in claim 2 wherein said first winding portion is further arranged to be energized when it is desirable to operate the motor in a 6-pole configuration.

6. A motor as set forth in claim 1 further comprising an unshared winding on the stator core, said unshared winding being energized when it is desirable to operate the motor in a 6-pole configuration.

7. A motor as set forth in claim 1 wherein the stator core comprises a plurality of slots and the partially shared winding includes a first winding portion that is carried in a generally nonsinusoidal distribution within a first group of the plurality slots and a second winding portion that is carried in a generally sinusoidal distribution within a second group of the plurality of slots.

8. A motor as set forth in claim 7 wherein the unshared winding portion is being energized in connection with the first winding portion of the partially shared winding when it is desirable to operate the motor in the 8-pole configuration, and wherein said unshared winding portion is carried in a generally sinusoidal distribution within a third group of the plurality of slots.

9. A motor as set forth in claim 1 further comprising:
an auxiliary starting winding on the stator core; and
a starting switch for energizing the auxiliary winding to initiate a rotation of the rotor, said starting switch de-energizing the auxiliary winding when the rotation of the rotor exceeds a rotational threshold.

10. A motor comprising:
a stator core;
a rotor mounted in rotational relationship with the stator core;
a plurality of windings components wound on the stator core;
a first one of the plurality of winding components and a second one of the plurality of winding components being selectively energized to operate the motor at a 4-pole pole speed; and
a third one of the plurality of winding components and the first one of the plurality of winding components being selectively energized to operate the motor at an 8-pole pole speed such that the second one of the plurality of winding components is only energized when the motor is operated at the 4-pole pole speed and the third one of the plurality of winding components is only energized when the motor is operated at the 8-pole speed.

11. A motor as set forth in claim 10 wherein a fourth one of the plurality of winding components is selectively energized only to operate the motor at a 6-pole pole speed.

12. A single phase, three-speed induction motor comprising:
a stator core;
a rotor mounted in rotational relationship with the stator core;
a first winding being wound on the stator core and being selectively energized in an N-pole configuration wherein N is at least two and is an integer multiple of two, said first winding including a first winding portion and a second winding portion;
a second winding being wound on the stator core and being selectively energized in an M-pole configuration, wherein M is an even integer and is at least two-times N, said second winding including a third winding portion; and
wherein said second winding shares the first winding portion of the first winding but not the second winding portion of the first winding, and wherein the first winding does not share the third winding portion of the second winding.

13. A motor as set forth in claim 12 wherein N is two, four, or eight.

14. A motor as set forth in claim 12 wherein N is four and further comprising a third winding being wound on the stator core and being selectively energized in a 6-pole configuration.

15. A motor arranged to be operated at a plurality of pole speeds, said motor comprising:
a stator core;
a rotor in rotational relationship with the stator core;
a first winding portion on the stator core for operating the motor at a first pole speed, said first winding portion having a substantially sinusoidal wire turn distribution; and
a second winding portion on the stator core for operating the motor at the first pole speed, said second winding portion having a substantially nonsinusoidal wire turn distribution.

16. A motor as set forth in claim 15 further comprising a third winding portion on the stator core being energized in connection with the second winding portion for operating the motor at a second pole speed.

17. A motor as set forth in claim 16 wherein the first pole speed corresponds to a 4-pole configuration and the second pole speed corresponds to an 8-pole configuration.

18. A motor arranged to be operated in a 4-pole configuration and an 8-pole configuration, said motor comprising:
a stator core;
a rotor in rotational relationship with the stator core;
a first winding portion wound on the stator core being energized only when operating the motor in the 4-pole configuration, said first winding portion having a substantially sinusoidal wire distribution; and
a second winding portion wound on the stator core being energized when operating the motor in both the 4-pole configuration and the 8-pole configuration, said second winding portion having a substantially nonsinusoidal wire distribution.

19. A motor as set forth in claim 18 further comprising:
a third winding portion wound on the stator core being energized only when operating the motor in the 4-pole configuration, said third winding portion having a substantially sinusoidal wire distribution; and
a fourth winding portion wound on the stator core being energized when operating the motor in both the 4-pole configuration and the 8-pole configuration, said fourth winding portion having a substantially nonsinusoidal wire distribution.

20. A motor as set forth in claim 19 further comprising:
a third winding portion wound on the stator core and being energized only when operating the motor in the 8-pole configuration such that when the motor is operated in the 8-pole configuration, the second and third winding portions are energized.

21. A motor arranged to be operated in a 4-pole configuration, a 6-pole configuration, and an 8-pole configuration, said motor comprising:
a stator core;
a rotor in rotational relationship with the stator core;
a first winding portion wound on the stator core, said first winding portion being energized in the 4-pole configuration only;
a second winding portion wound on the stator core, said second winding portion being energized in the 6-pole configuration only;
a third winding portion wound on the stator core, said third winding portion being energized in the 8-pole configuration only; and
a fourth winding portion wound on the stator core, said fourth winding portion being energized in the 4-pole configuration and the 8-pole configuration, but not being energized in the 6-pole configuration.

22. A motor as set forth in claim 21 further comprising a fifth winding portion wound on the stator core, said fifth winding portion being energized in the 4-pole configuration, the 6-pole configuration, and the 8-pole configuration.

* * * * *

UNITED STATES PATENT AND TRADEMARK OFFICE
CERTIFICATE OF CORRECTION

PATENT NO.    : 6,815,926 B2
DATED         : November 9, 2004
INVENTOR(S)   : Renyan William Fei and Mark C. Dierkes It is certified that error appears in the above-identified patent and that said Letters Patent is hereby corrected as shown below:

Drawings,
Figures 2 and 3, replace "OUX" with -- AUX --

Signed and Sealed this

Fifth Day of July, 2005

JON W. DUDAS
*Director of the United States Patent and Trademark Office*